Jan. 11, 1966     I. L. JOY     3,228,231
APPARATUS FOR SIGNAL REFLECTION ULTRASONIC FLAW TESTING
Filed March 9, 1962     3 Sheets-Sheet 1
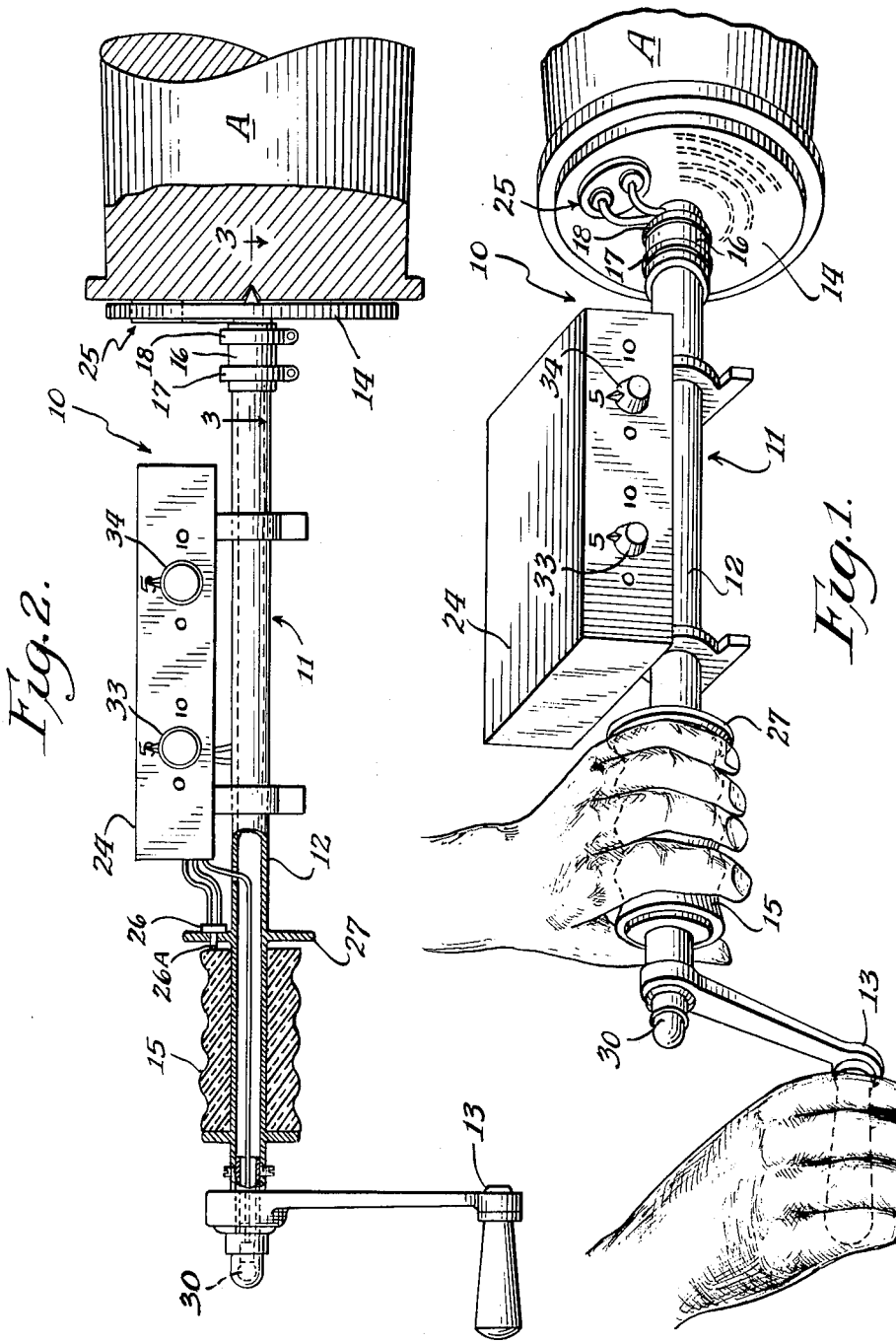
Inventor
Ivan L. Joy.
By Mann, Brown & McWilliams
Attys.

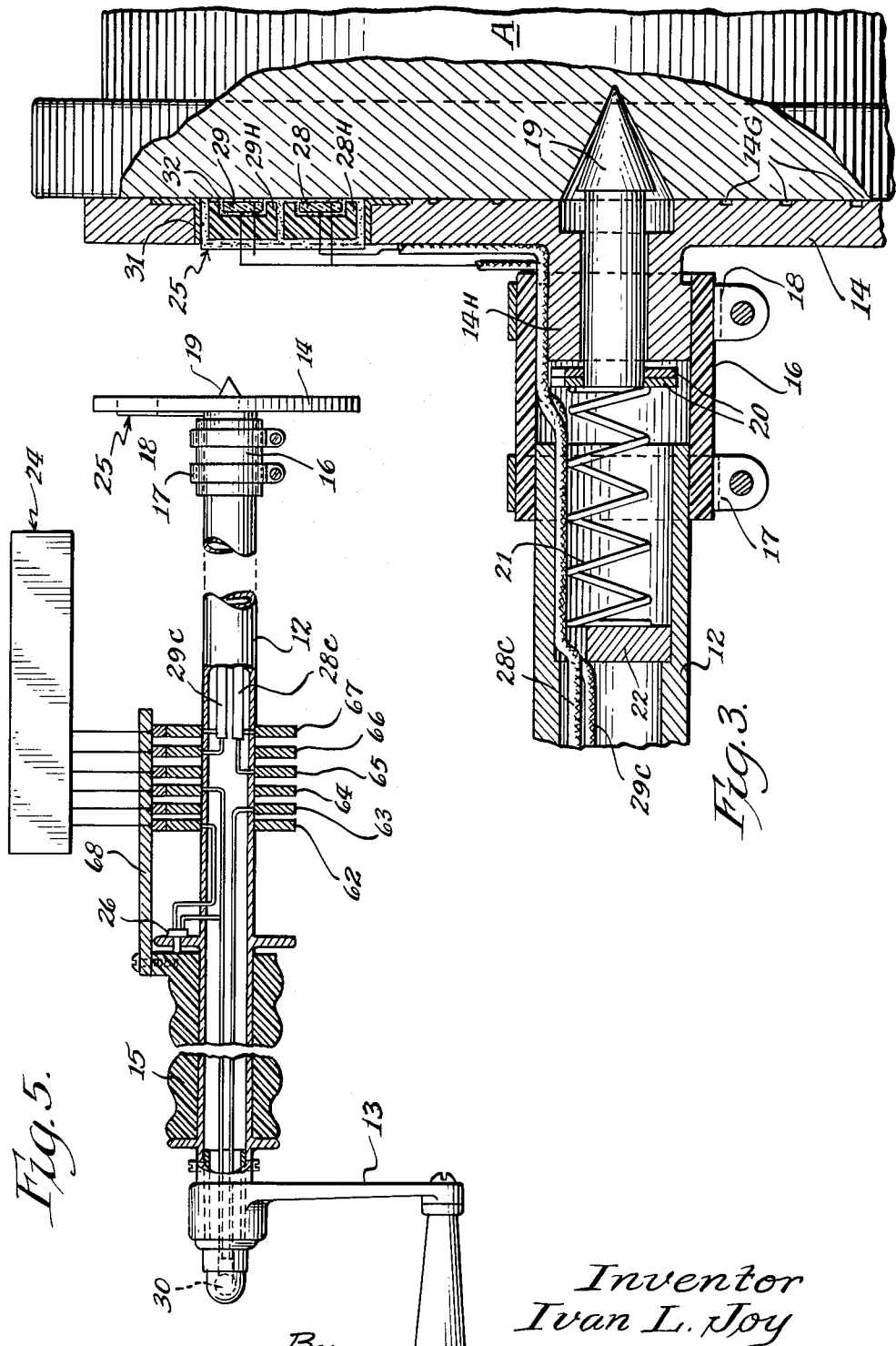

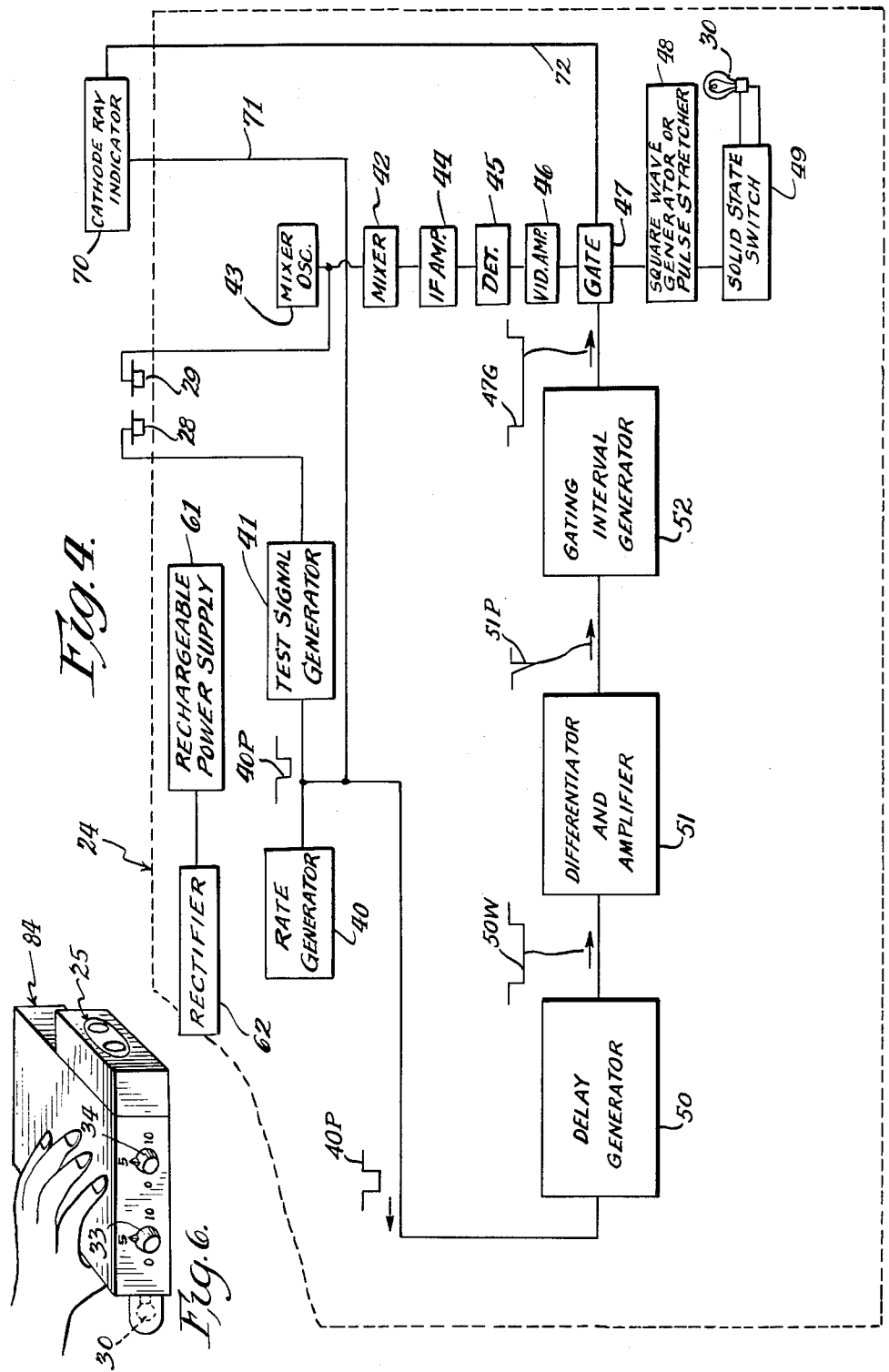

United States Patent Office 3,228,231
Patented Jan. 11, 1966

3,228,231
APPARATUS FOR SIGNAL REFLECTION
ULTRASONIC FLAW TESTING
Ivan L. Joy, 1616 W. Dudley Road, Topeka, Kans.
Filed Mar. 9, 1962, Ser. No. 178,654
5 Claims. (Cl. 73—67.7)

This invention relates to signal reflection ultrasonic flaw testing and more particularly is concerned with providing portable equipment suitable for numerous field applications involving hand testing and also suitable for permanent installations where size, ruggedness and cost features are desired without sacrifice of performance capabilities.

At present, equipment for field application of ultrasonic flaw testing is unduly bulky and due to its design and principle of operation usually requires the use of a cathode ray type indicator if a reliable interpretation of the signal reflection intelligence is to be made. This is particularly true in the case of axle testing of railway car wheels but it is also true in other types of on-location signal reflection testing.

Related to the axle testing and similar on-location testing problems is the need for a solid state type of ultrasonic test unit as this would satisfy the requirement of compactness and ruggedness and make feasible a truly portable device. Lack of a capability of broad dynamic range adjustment has limited the application of solid state techniques in ultrasonic flaw testing equipment.

Accordingly, the principal objects of the invention are to provide solid state ultrasonic flaw test equipment capable of broad dynamic range adjustment; and to provide solid state ultrasonic flaw test equipment particularly suited to on-location signal-reflection type ultrasonic flaw testing.

Another object of the invention is the provision of a crank-type portable unit for use in ultrasonic flaw testing of railway car wheel axles.

Still another object of the invention is the provision of a self-contained testing unit or tool having solid state ultrasonic gear mounted in piggy-back fashion thereon and coupled to test objects through transducers carried on the tool.

Other objects and advantages will become apparent during the course of the following description.

In the accompanying drawings forming a part of this specification and in which like numerals are employed to designate like parts throughout the same:

FIG. 1 is a perspective view of a portable ultrasonic test unit embodied in the form of a crank for use in the inspection of axles for flaws;

FIG. 2 is a side elevational view of the axle test unit with portions thereof broken away and sectioned to facilitate disclosure;

FIG. 3 is an enlarged fragmentary sectional view at the free end of the test unit and is taken approximately on the line 3—3 of FIG. 2;

FIG. 4 is a block diagram of a solid state electronic circuit arrangement utilized as a transceiver in the axle test unit of FIGS. 1 and 2;

FIG. 5 is a side view of an alternative crank-type axle test unit equipped with slip ring connections to facilitate use of the unit with a separately located ultrasonic transceiver; and FIG. 6 is a perspective view of a portable type general purpose ultrasonic test unit.

Referring now to the drawings, for purposes of illustrative disclosure, one preferred embodiment of the invention is designated generally at 10 in FIGS. 1 and 2, and is shown applied in the ultrasonic flaw testing of a railway car wheel axle A.

In these axles, the dangerous defects occur adjacent the axle periphery due to heat generated at the bearing surface region. Such defects grow inwardly toward the axis of the axle and must be detected before they become large enough to be dangerous.

Accordingly, in the flaw testing of railway car wheel axles, it is the region adjacent the periphery of the bearing surface which is to be inspected. Inspection of the central region is not required as the stresses acting there are not significant and in any event it is impracticable in view of the extreme coarse grain size conditions and numerous harmless defects existing at and near the axle center. Coarse grain size conditions sometimes exist adjacent the periphery of the axle and this has made it difficult to obtain reliably distinguishable flaw indications with conventional signal reflection type ultrasonic test equipment.

One approach to the problem has led to the use of multicrystal arrays connected through elaborate balance circuit networks for cancelling coarse grain size indications. The ultrasonic equipment previously used has been unduly bulky and in order to facilitate interpretation, it has generally been necessary to display the signal reflection patterns on a cathode ray tube type indicator.

According to the present invention, an extremely compact portable test unit is provided, having particular utility in axle testing. The unit is manually operable to sweep a contact probe continuously along a path adjacent the periphery of the axle end face to generate a characteristic indication pattern that is easily interpreted even without use of a cathode ray type indicator.

The axle test unit 10 of this invention utilizes a crank 11 having a tubular crank shaft 12 and a crank handle 13. The crank shaft 12 is equipped with a probe in the form of a contact plate 14 carried at its free end for flush faced sliding engagement with the end face of the axle A. A rigid sleeve 15, preferably of wood, loosely encircles the crank shaft adjacent its handle end to provide a convenient hand grip and permit an operator to grasp and operate the unit in the fashion indicated in FIG. 1 to rotatably drive the contact plate 14 through a circular scanning path by application of a cranking action.

The contact plate 14, as best shown in FIG. 3, is mounted to the crank shaft 12 through a sleeve 16 of flexible plastic material with clamping bands 17 and 18, respectively, locking the inner end of the sleeve to the crank shaft and the outer end of the sleeve to a hub stem 14H provided at the center of the contact plate. This flexible sleeve mount for the contact plate permits the plate to remain flush against the end face of the axle over a limited range of tipping movement of the crank.

To facilitate establishing and maintaining the desired scanning path, a center locating element 19 is floatingly mounted in the hub 14H of the contact plate and is resiliently biased axially outwardly to find self-locating engagement in the center eye of the axle A. The center locating element 19 is retained against accidental escape by radial pins 20 projecting crosswise at its inner end and it is normally urged outwardly sufficiently to accommodate seating in the various size axle eyes that are encountered. A bias spring 21 acts upon the center and it is preferably located within the end of the crank shaft to react against a spring seat 22 fixed crosswise therein.

A completely self-contained solid state ultrasonic electrical signal transceiver unit, designated generally at 24, is mounted in piggyback fashion upon the crank shaft 12 to rotate in unison therewith and is electrically connected to an electromechanical ultrasonic transducer component 25 mounted in the contact plate 14 for coupling ultrasonic vibrations to the axle through a film of oil, water or other suitable liquid that is applied to the axle, to the contact plate, or to both. The contact plate 14 has a series of concentric grooves 14G on its contact face and during rotation, these grooves develop a pumping action on the couplant and continuously insure an even distribution thereof over the face of the axle end. The transceiver unit 24 is controlled by an on-off switch 26 mounted adjacent a stop ring 27 provided on the crank shaft for limiting the axial movement of the hand grip 15. The on-off switch 26 may be of any conventional type and preferably is provided with a spring biased actuating arm 26A projecting beyond the stop ring 27 to be engaged by endwise movement of the hand grip along the crank shaft, as normally occurs when the crank unit is held against the end face of the axle.

The transceiver 24 periodically generates an ultrasonic electrical test signal to fire the transducer component 25 for transmitting a corresponding ultrasonic vibrational test signal into the axle A. The transducer component senses ultrasonic vibrational signal reflection patterns representative of the internal structural characteristics of the peripheral regions of the axle and corresponding ultrasonic electrical signal reflection patterns are applied to the transceiver to operate any suitable indicator connected thereto. In the form illustrated herein a light bulb 30 is shown mounted in the crank shaft at the handle end thereof.

As is apparent in FIG. 1, the entire transceiver unit 24 is mounted in a case about one-half the size of a cigar box and the use of a simple light bulb indicator makes it convenient for all the ultrasonic equipment to rotate in unison with the crank shaft 12 and permits convenient application of the crank principal for developing a circular scan of the region adjacent the periphery of the axle.

In the preferred form, the transducer component 25 comprises separate sender and receiver elements 28 and 29, respectively, and piezoelectric crystals are preferred for these elements. As best indicated in FIG. 3, the contact plate 14 is provided with a hole that is fitted with a generally oval shaped ring 31 to define a mounting pocket in which crystal holder blocks 28H and 29H are cemented in side-by-side relation. Each crystal is recessed in its holder block and the faces of the crystals are covered by a coating 32 comprised of a mixture of an epoxy resin and silicon carbide for providing the required wear resistance. Preferably, this wear resistant coating 32 may project about $\frac{1}{32}$ inch beyond the plane of the contact plate.

The application of the unit to axle testing is indicated in the illustration in FIG. 1 wherein it will be apparent that the crank shaft, the contact plate 14, and the transceiver unit 24 rotate in unison with the crank handle 13 while only the hand grip 15 remains stationary. When the center 19, carried by the contact plate, is engaged in the axle eye hole, the hand grip 15 moves against the stop ring 27 to actuate the switch 26 and energize the transceiver unit. The transceiver periodically sends out test signals while the transducer component 25 sweeps through a circular path adjacent the periphery of the axle end. This sweeping action permits a single transducer component to scan the full periphery of the axle.

A repetition rate on the order of 2,000 cycles per second may be employed.

More importantly, the continuous movement of the transducer during the test gives, in effect, an added dimension of intelligence. The position of the transducer at the time that the indicator bulb 30 lights up indicates the angular position of the flaw. The time interval during which the bulb remains lighted gives an approximation of the size of the flaw and where more than one flaw is present, separate indications will appears.

Another important advantage of the crank action is that it gives the operator additional intelligence information to facilitate interpretation of the indications. Signal reflections can and do occur from axles characterized by coarse grain size conditions and with stationary testing it is very difficult to distinguish coarse grain size conditions from dangerous defects. The continuous cranking motion however causes the indicator to exhibit a characteristic pattern in response to coarse grain size conditions and this becomes distinguishable from the characteristic defect indication. When a defect is detected, it appears as a somewhat prolonged stable amplitude signal which lights the indicator bulb in a steady positive fashion, though momentary. When coarse grain size conditions are encountered, an erratic signal of constantly varying amplitude results and produces a faint or unstable fluctuation of light from the indicator bulb. While separate sender and receiver crystals are shown herein, and are preferred, it should be apparent to those skilled in this art that a single common crystal can be employed.

In the application of the crank unit to the testing of freight car axles, it should operate at a depth range of from 2″ to 10″ whereas in the testing of axles on diesel locomotives the unit may operate at a depth range of from 12″ to 2′ in order to include the wheel seat region. Moreover, it may be desired to test the full length of the axle from the same side, in which case, a much greater depth range is required. Still other depth range requirements are encountered in other ultrasonic inspection applications to which the present equipment may be adapted. Accordingly, the transceiver unit 24 is shown equipped with control adjustments 33 and 34, respectively, for effecting various settings of the delay generator and the gating interval generator contained in the transceiver. These permit the operator to select the range desired in any given inspection application.

The circuit for the transceiver 24 is shown in block diagram form in FIG. 4 and its transmitting equipment includes a rate generator 40 supplying trigger pulses 40P to a test signal generator 41 that is connected to the sender crystal 28 that may be resonant at 2.5 megacycles. The rate generator 40 may be a blocking oscillator supplying trigger pulses of one to five microsecond duration at a rate of 2,000 per second.

The test signal generator 41 may be a pulsed oscillator operating at a frequency selected in the range from 2 to 5 megacycles.

The receiving equipment of the transceiver includes a mixer 42 receiving input from the receiver crystal 29 and from a 17.5 megacycle mixer oscillator 43 to provide output at 15 megacycles. This output is fed successively to an I.F. amplifier 44, a detector 45, and a video amplifier 46.

A gate 47 controls indicator operation by controlling output from the video amplifier 46. In FIG. 4 the indicator is a lamp 30 and in view of its relatively slow response, the output from the gate is connected to trigger a pulse stretcher 48 which actuates a solid state switch 49 that controls an energizing circuit for the lamp 30. The pulse stretcher 48 may be a square wave generator set to provide an elongated output pulse sufficient to insure operation of the light 30. The gate 47 is controlled by a square wave gating signal 47G that is derived from the trigger pulses 40P in synchronism with the test signals applied to the sender crystal 28. Thus, a delay generator 50 is connected to the rate generator to respond to each trigger pulse and produce an elongated square wave 50W that generates a delay corresponding to its length. A differentiator and amplifier unit 51 responds to the trailing edge of the delay square wave to produce a pulse 51P that triggers a gating interval generator 52 which provides the square wave gating signal 47G to control the gate 47.

To provide extended dynamic range adjustment for the gating signal 47G, the time delay for regulating the initiation of the gating signal is adjustable by the control 33 of the delay generator 50 and the actual time duration of the gating signal is adjustable by the control 34 on the gating interval generator 52. Each of the controls 33 and 34 is preferably calibrated.

In the block diagram for the transceiver a power supply 61 is shown comprised of rechargeable batteries arranged to be charged through a rectifier 62 adapted to be plugged into and receive power from a conventional 60 cycle A.C. source during the time when the transceiver is not being used for testing. Normally a single charging operation will accommodate several days of testing. Connections from the power supply 61 to the various block elements are omitted in the diagram of FIG. 4.

In FIG. 5, ultrasonic test equipment of alternative form is shown wherein the transceiver 24 is separated from the crank shaft 12 and the crank shaft is fitted with a set of six wiper rings for effecting the necessary connections between the remote transceiver and the transducers, the light indicator 30 and the on-off switch 26, all of which rotate in unison with the crank. Wiper rings 62 and 63 furnish return connections for the switch 26 and light indicator 30, respectively, while wiper ring 64 connects to a common supply conductor for these elements. Wiper rings 65 and 66 connect to the core of separate coaxial cables 28C and 29C for the crystal transducers and wiper ring 67 is connected to the shields of these coaxial cables.

The hand grip sleeve 15 is shown equipped with an insulated extension strip 68 carrying contacts having continuous wiping engagement with the wiper rings and having connection leads to the transceiver unit 24. If desired, the indicator 30 and the switch 26 may be incorporated in the transceiver unit and thereby eliminate need for rings 62, 63 and 64.

In the articulated arrangement of FIG. 5 the transceiver need not be miniaturized and it may employ a cathode ray type indicator, if desired. Moreover, a cathode ray type indicator may be connected to the transistorized transceiver of FIG. 4 and this is indicated at 70 in FIG. 4. To synchronize the cathode ray indicator 70 with the rate generator 40, a connection line 71 is shown. If an A-scan presentation is to be provided, the line 71 would connect to the horizontal sweep circuit of the cathode ray tube while the vertical sweep circuit would be connected to the line 72 leading to the output from the gate 47. Where a B-scan presentation is employed the output from the gate 47 is applied to the control grid of the writing gun for the cathode ray tube and the horizontal sweep circuit is again connected over line 71 to be synchronized from the rate generator. In this instance, a continuously running vertical sweep circuit is employed. There will thus be presented a developed cross sectional representation along a circular line that runs adjacent to the periphery of the axis. The scale of the B-scan presentation is determined by the speed of rotation of the crank.

Finally, in FIG. 6 a modified transceiver unit arrangement is shown at 84 wherein the indicating light 30 and the transducer component are integrated into the mounting case to provide a test unit in the form of a hand carried test device. If desired, the transducer component 25 may be provided as a separately constituted hand carried probe but in either arrangement, the compactness and convenience of the arrangement offers important advantages over present day on-location type ultrasonic test equipment.

By way of illustration, typical circuit arrangements for the certain of the circuit components are listed below:

Rate generator 40: Handbook of Industrial Electronic Control Circuits, by John Markus and Vin Zeluff, page 310, Fig. 2.
Test signal generator 41: Handbook of Industrial Electronic Control Circuits, by John Markus and Vin Zeluff, page 309, Fig. 1, drawing A.
Video amplifier 46: Handbook of Industrial Electronic Control Circuits, by John Markus and Vin Zeluff, page 298, Fig. 1, drawing A.
Mixer 42 and mixer oscillator 43: General Electric Transistor Manual, fifth edition, page 67, Fig. 8.1.
Gate 47 and switch 49: General Electric Transistor Manual, page 91, Fig. 10.4.

It should be understood that the description of the preferred form of the invention is for the purpose of complying with Section 112, Title 35, of the U.S. Code and that the appended claims should be construed as broadly as the prior art will permit.

What is claimed is:

1. An ultrasonic signal reflection type flaw test unit comprising a crank having a shaft defining an axis of rotation therefor, a rigid sleeve adapted to be suitably supported, said rigid sleeve being disposed in surrounding relationship to said shaft and mounted for rotation relative to said shaft whereby said shaft is adapted to be rotatably supported by said sleeve when the sleeve is suitably supported, means for limiting axial movement of said sleeve with respect to said shaft, a contact element mounted on one end of said shaft and engageable with a test piece to rotate about said axis upon rotation of said crank, an electromechanical transducer component mounted on said contact element at a location spaced from said axis to swing about said axis upon rotation of the crank and establish sliding ultrasonic coupling with a test piece, an ultrasonic transceiver supported by said shaft and having means for periodically generating electrical test signals of ultrasonic frequency, means for receiving electrical signals of ultrasonic frequency, and means connecting said generating means to said transducer component to transmit corresponding mechanical test signals into a test piece and connecting the transducer component to said receiving means to transmit electrical signals corresponding to mechanical reflection signals returning from discontinuities in a test piece, and indicating means supported by said shaft and being responsive to the output of said receiving means.

2. Apparatus as defined in claim 1 wherein said contact element includes an outwardly directed face having surface grooves opening outwardly thereof and acting to distribute liquid couplant between a test piece and the contact element.

3. Apparatus as defined in claim 1 wherein said sleeve is also mounted for limited axial movement relative to said shaft, switch means for controlling operation of said transceiver, said sleeve actuating said switch means upon movement of the sleeve relative to said shaft.

4. Apparatus as defined in claim 1 wherein said transducer component includes an outwardly directed face, said face being covered by a wear resistant coating, said contact element defining a substantially planar outwardly directed surface, said coating projecting beyond said planar surface.

5. Apparatus as defined in claim 4 wherein said coating comprises a mixture of an epoxy resin and silicon carbide.

(References on following page)

References Cited by the Examiner

UNITED STATES PATENTS

| | | | |
|---|---|---|---|
| 2,398,701 | 4/1946 | Firestone | 73—67.9 |
| 2,402,917 | 6/1946 | Miller. | |
| 2,562,449 | 7/1951 | De Lano | 73—67.9 |
| 2,827,574 | 3/1958 | Schneider | 307—88.5 |
| 2,976,432 | 3/1961 | Geckle | 307—88.5 |
| 3,002,375 | 10/1961 | Moffatt | 73—67.8 |
| 3,009,353 | 11/1961 | Erdman | 73—67.9 |
| 3,019,637 | 2/1962 | Cook et al. | 73—67.7 |
| 3,044,291 | 7/1962 | Klatchko | 73—67.8 |
| 3,051,956 | 8/1962 | Theobald | 73—67.9 X |
| 3,077,769 | 2/1963 | Rankin | 73—67.8 |
| 3,121,326 | 2/1964 | Klatchko | 73—67.7 |

RICHARD C. QUEISSER, *Primary Examiner.*

JOHN P. BEAUCHAMP, *Examiner.*

JAMES J. GILL, *Assistant Examiner.*